3,219,662
TRANSFORMATION PRODUCTS OF CEPHALO-
SPORIN C AND DERIVATIVES THEREOF
Edward Penley Abraham and Guy Geoffrey Frederick Newton, Oxford, England, assignors to National Research Development Corporation, London, England, a British corporation
Filed Apr. 30, 1962, Ser. No. 191,213
5 Claims. (Cl. 260—243)

This application is a continuation-in-part application of our co-pending application Serial No. 45,364, filed July 26, 1960 and relates to transformation products of Cephalosporin C, and derivatives thereof, and to methods for the preparation of such compounds.

In U.K. patent specification No. 810,196 there is described a process for the separation of a new antibiotic, Cephalosporin C, from the products of a fermentation process using a species of Cephalosporium. At the date of the said application, the structure of Cephalosporin C was unknown, and this handicapped work on the preparation and identification of derivatives of Cephalosporin C which might also show useful biological activities.

Cephalosporin C is relatively stable to acid, losing no detectable activity on standing in 0.1 N hydrochloric acid at room temperature for 4 hours. However, the action of hot concentrated hydrochloric acid for an extended period, e.g. 18 hours, will disrupt the Cephalosporin C molecule and destroy all its biological activity.

An acid treatment of Cephalosporin C is described in the Ciba Foundation Symposium on Amino Acids and Peptides With Anti-metabolic Activity, 1958, pp. 205-223. It is disclosed that the treatment of Cephalosporin C with 0.1 N hydrochloric acid at 20° C. yields at least two acidic and three neutral compounds all of which are ninhydrin-positive. The neutral compounds are readily separated from each other on paper chromatograms run in butanol-acetic acid-water (4:1:4). One of them ($R_F 0.15$) shows antibacterial activity and has been named Cephalosporin $C_c$, the preparation and properties of which are described in more detail in co-pending U.S. application Serial No. 798,855 now Patent No. 3,049,541 granted August 14, 1962 as well as Serial No. 153,261 filed November 16, 1961.

It has now been discovered that if Cephalosporin C be subjected to certain conditions of acid hydrolysis, to be described hereinafter, a transformation product is produced which is of an entirely distinct character from the prdoucts obtained under the conditions of acid treatment described above. Thus, by treating Cephalosporin C in accordance with this invention, the Cephalosporin C molecule is split into two parts, one being a complex nucleus and the other being a side chain which is α-aminoadipic acid and is attached to the complex nucleus at the 7-position thereof (the 7-position being as hereinafter defined). In this specification, compounds having a structure of this type i.e. a complex nucleus having the basic ring structure of the Cephalosporin C nucleus and an α-aminodipic acid side chain attached to it in the 7-position are referred to as having the nucleus/side chain type of structure.

It has been found that the biological properties of Cephalosporin C are dependent in the main upon the more complex structure of the nucleus, and the present invention has enabled compounds analogous to Cephalosporin C to be produced for the first time i.e. by the addition of other side chains to the nucleus using chemical techniques known per se. Such derivatives show similar but modified or perhaps increased activity to that of Cephalosporin C itself. The discovery of the nucleus/side chain type of structure for Cephalosporin C and of a method of separating and isolating the nucleus is therefore of great importance in the field of antibiotics.

Apart from Cephalosporin C, the structure of which has now been elucidated, there are certain derivatives thereof which have already been prepared and identified and which have been found also to have the nucleus/side chain type of structure. One such compound is Cephalosporin $C_c$, reference to which has been made above. Other such compounds are described in co-pending U.S. application Serial No. 799,343 filed March 13, 1959 and abandoned in favour of continuation-in-part, Serial No. 254,558 filed January 25, 1963 i.e. antibiotic substances which are transformation products of Cephalosporin C and are referred to as Cephalosporin $C_A$ compounds. These may be obtained by treatment of Cephalosporin C in aqueous solution with a weak, tertiary, heterocyclic base, for example pyridine, collidine or quinoline. If pyridine is used, the resultant antibiotic is referred to as Cephalosporin $C_A$ (pyridine).

According to the invention, therefore, there is provided a process for the preparation of a compound selected from the group consisting of the nucleus of Cephalosporin C, the nucleus of Cephalosporin $C_c$ and the nucleus of a Cephalosporin $C_A$ compound comprising hydrolysing a compound selected from the group consisting of Cephalosporin C, Cephalosporin $C_c$ and a Cephalosporin $C_A$ compound so that cleavage of the side-chain from the nucleus occurs and isolating the nucleus so formed from the reaction mixture. The hydrolysis is preferably effected by treatment with acid, which term includes within its scope acidic ion exchange materials.

The hydrolysis is preferably carried out using dilute mineral acid, and dilute hydrochloric acid has been found to be especially suitable. Other convenient acids are sulphonic acids and sulphonated polystyrene resins. In carrying out the process, the acid-treated solution containing Cephalosporin C, Cephalosporin $C_c$ or a Cephalosporin $C_A$ compound is usually allowed to stand until a relatively high yield of nucleus has been obtained, a time dependent upon the severity of the conditions but normally of the order of a few days. The nucleus can then be separated from the reaction products by methods known per se, for example paper electrophoresis and/or paper chromatography. In using these techniques, the separated nucleus can usually be identified on the paper by the characteristic of showing no antibiotic activity itself at the concentrations used (tested by placing electrophoresis paper in contact with plates seeded with *Staphylococcus aureus* [Oxford strain]) but having activity after treatment with phenylacetyl chloride to cause phenylacetylation. This treatment can conveniently be carried out by first spraying the paper with M-pyridine in 50% acetone followed by phenylacetyl chloride (1.25% v./v.) in acetone. The phenylacetyl derivative can be separated by chromatographic and electrophoretic means.

In one embodiment of the invention, the Cephalosporin $C_c$ which is hydrolysed is prepared in situ from Cephalosporin C. Acid treatment of Cephalosporin C, as disclosed in co-pending U.S. application Serial No. 798,855, gives Cephalosporin $C_c$ and, by continuing the acid treatment beyond the optimum conditions for the production of Cephalosporin $C_c$ the optimum conditions for the production of the nucleaus of Cephalosporin $C_c$ are reached. It has been found, since the filing of

U.S. application Serial No. 798,855 that .5 N to N hydrochloric acid for less than 1 day are the preferred conditions for the production of Cephalosporin $C_c$ and thus preferred conditions for the production of the nucleus thereof involve the treatment of Cephalosporin C with from .5 N to N hydrochloric acid for from 2 to 4 days.

In a further embodiment of the invention, nuclei of Cephalosporin $C_A$ compounds are prepared by a method comprising the steps of treating Cephalosporin C with acid to form the nucleus of Cephalosporin C and then treating the nucleus so formed with a weak tertiary base to form the nucleus of Cephalosporin $C_A$.

The reaction conditions for the preparation of the nuclei of Cephalosporin C, $C_c$ and $C_A$ from Cephalosporin C, $C_c$ and $C_A$ respectively can be varied considerably but a preferred method has been found to involve the use of hydrochloric acid of strength in the range of about .1 N to N at a temperature in the range of about $-10°$ C. to $+50°$ C. for a length of time in the range of about 12 hours to 30 days, the conditions being arranged within these limits so as to provide a high yield of hydrolysis products. One suitable method involves the use of 0.1 N hydrochloric acid in the vicinity of ambient temperature for about 3 days.

On treating Cephalosporin C with acid, of strength in the range as hereinbefore defined, at least two reactions commence. These are (1) the hydrolysis of Cephalosporin C to cleave the bond joining the nucleus to the side chain (2) the reaction of acid with the Cephalosporin C molecule to produce Cephalosporin $C_c$. Moreover, once some Cephalosporin $C_c$ is produced in the reaction mixture, a third reaction commences, i.e., the hydrolysis of Cephalosporin $C_c$ to cleave the bond joining the Cephalosporin $C_c$ nucleus to the side chain. In addition some Cephalosporin $C_c$ nucleus is formed by reaction of acid with the Cephalosporin C nucleus. Thus, if the treatment of Cepholosporin C with acid is carried out with the purpose of obtaining the nucleus of Cephalosporin C, the conditions of the reaction are chosen to provide a relatively high proportion of Cephalosporin C nucleus and a relatively low proportion of Cephalosporin $C_c$ nucleus. Similarly, if the reaction is carried out for the purpose of obtaining the nucleus of Cephalosporin $C_c$, the conditions of the reaction are chosen to provide a relatively high proportion of Cephalosporin $C_c$ nucleus. The most suitable conditions for the reactions can be established by simple experiment, and we have found that, starting with Cephalosporin C, .1 N hydrochloric acid at 20° C. for about 3 days provides a good yield of the Cephalosporin C nucleus and .5 to 1 N hydrochloric acid at 20° C. for about 3 days provides a good yield of the Cephalosporin $C_c$ nucleus. The conditions can be contrasted with the .1 N hydrochloric acid at 20° C. for about 5 days by which time from the table 3 in co-pending U.S. application Serial No. 798,855 the best yields of Cephalosporin $C_c$ which can be obtained by using .1 N hydrochloric acid are obtained and, by which time also, the Cephalosporin C nucleus formed at an earlier stage has virtually disappeared.

Further according to the invention, there is provided the nucleus of Cephalosporin C, being a transformation product of Cephalosporin C which has been named 7-aminocephalosporanic acid, and which has the structure and the sodium, potassium, ammonium and strong acid salts thereof. Of particular importance are the nucleus itself and the mineral acid salts, especially the hydrochloride. It will be understood that the nucleus has a similar steric structure to the corresponding part of Cephalosporin C obtained by fermentation from the Cephalosporium. The nucleus itself can be further identified by the following properties after phenylacetylation as hereinbefore described:

(1) The Cephalosporin C nucleus fraction of the preparation migrates slightly faster than Chephalosporin C towards the anode on electrophoresis at pH 7 (with aqueous collidine acetate as solvent).

(2) The Cephalosporin C nucleus fraction migrates about half as fast as Cephalosporin C towards the anode at pH 4.5 (with aqueous pyridine acetate as solvent).

(3) The Cephalosporin C nucleus fraction remains near the point of origin on electrophoresis at pH 4.0 (in aqueous pyridine acetate), showing only a relatively small migration towards the anode. Under these conditions Cephalosporin C still migrates to the anode almost as rapidly as at pH 7.

(4) After electrophoresis in 10% acetic acid, elution from the paper and hydrolysis in N-HCl at 105° for 16 hours it yielded some glycine (50 μg. giving a spot of similar intensity to the glycine spot obtained on hydrolysis of 50 μg. of Cephalosporin C) but no α-aminoadipic acid. It thus did not contain the side chain of the Cephalosporin C molecule.

(5) The Cephalosporin C nucleus fraction shows an $R_F$ similar to that of N-pheylacetyl Cephalosporin C (0.08–0.15) in butanol-ethanol-water (4:1:5 by vol.).

(6) After chromatography in butanol-ethanol-water, or after electrophoresis, and then being sprayed on the paper with penicillinase in 0.% gelatin solution (concentration of enzyme 10 times that required to inactivate a spot of 50 ug. of benzylpenicillin) it yields a spot of apparently undiminished activity when sprayed with phenylacetyl chloride and pyridine.

(7) When spotted on to paper, sprayed with pyridine acetate pH 7 (2 M to pyridine), suspended while damp over the vapour of a solution of 2 M-pyridine acetate at 37° for 16 hours, dried, subjected to electrophoresis at pH 7, and then phenylacetylated, an active spot (due to the phenylacetyl derivative of Cephalosporin $C_A$ (pyridine) nucleus) appears in the neutral position as well as a spot in a position slightly nearer the anode than that occupied by Cephalosporin C.

(8) After electrophoresis on paper, the nucleus gave a yellowish-brown colour with ninhydrin which later changed to grey-blue (6-aminopenicillanic acid has been reported not to give a normal ninhydrin colour).

After paper electrophoresis or chromatography, it could be readily detected (like Cephalosporin C) as a dark absorbing spot by placing the paper before a source of ultraviolet light.

Further according to the invention there is provided the nucleus of Cephalosporin $C_c$, being a transformation product of Cephalosporin C and being the lactone of desacetyl-7-aminocephalosporanic acid and having the structure and strong acid salts thereof. Of particular importance are the nucleus itself and the mineral acid salts, particularly the hydrochloride. It will be understood that, as in the case of the nucleus of Cephalosporin C the steric structure of the molecule is similar to that of the corresponding part of Cephalosporin C obtained by fermentation from the Cephalosporium. This compound can be further identified by means of the following properties of the nucleus after phenylacetylation:

(1) On electrophoresis on paper in pyridine acetate buffer, (pH 4.5), the Cephalosporin $C_c$ nucleus moves approximately the same distance towards the cathode as the Cephalosporin C nucleus moves towards the anode.

(2) On electrophoresis on paper with 10% acetic acid buffer, the Cephalosporin $C_c$ nucleus migrates towards the cathode two and a half times as fast as Cephalosporin C nucleus.

(3) On chromatography in butanol-ethanol-water (4:1:5 by vol.) the $R_F$ factor of the Cephalosporin $C_c$ nucleus derivative is 0.33, compared with 0.08–0.15 for that of Cephalosporin C and 0.08 for the Cephalosporin $C_A$ nucleus.

Further according to the invention, there are provided nuclei of Cephalosporin $C_A$ being transformation products of Cephalosporin C having the following structure:

in which R+ represents a weak tertiary heterocyclic base as defined in co-pending U.S. application Serial No. 799,343 attached to the —$CH_2$— group via a nitrogen atom, and strong acid salts thereof. Of particular importance are the nucleus itself and the mineral acid salts, especially the hydrochloride.

Again it will be understood that the steric structure is similar to that of the corresponding part of Cephalosporin C obtained by fermentation from the Cephalosporin. The preferred tertiary base is pyridine and the phenyacetyl derivative of the nucleus in which R+ represents pyridine, can be further identified from the following properties:

(1) On paper electrophoresis at pH 4.0 in pyridine acetate buffer, the Cephalosporin $C_A$ nucleus moves a similar distance towards the cathods as Cephalosporin C moves towards the anode. When electrophoresis was carried out in 10% acetic acid, the Cephalosporin $C_A$ nucleus moved about twice as fast towards the cathode as did Cephalosporin $C_A$ (pyridine).

(2) Cephalosporin $C_A$ (pyridine) nucleus is not destroyed by the action of penicillinase under conditions which completely destroy 50 μg. of penicillin G.

(3) Cephalosporin $C_A$ (pyridine) nucleus is distinguished from Cephalosporin $C_c$ nucleus on paper chromatograms run with n-butonal-ethanol-water (4:1:5 by volume).

The compounds of the invention as hereinbefore defined i.e. the nuclei of Cephalosporin C, $C_c$ and $C_A$, are especially important as they are intermediates from which further derivatives may be prepared having biological activity.

Further according to the invention, therefore, there are provided antibiotically-active N-acyl derivatives of a compound selected from the group consisting of the nucleus of Cephalosporin C, Cephalosporin $C_c$ and a Cephalosporin $C_A$ compound of the general formula in which $R_1$ and $R_2$ represent groups selected from the group consisting of a hydrogen atom, an alkyl group, an aryl group and a group of structure $R_3$—O—, in which $R_3$ is selected from the group consisting of an alkyl group and an aryl group, and X is selected from the group consisting of the residue of the nucleus of Cephalosporin C, Cephalosporin $C_c$ and a Cephalosporin $C_A$ compound attached to the acyl group through its 7-position, and sodium, potassium and ammonium salts thereof.

These compounds have considerable biological activity.

For instance, the phenylacetyl derivative of the Cephalosporin C nucleus has an activity of about 1,000 units/mg. in the degree of purity hitherto obtained. Its biological spectrum is given in Example 2. The phenoxyacetyl derivative of the Cephalosporin C nucleus has been found to have similar activity to the phenyacetyl derivative, and the n-propionyl α-phenoxypropionyl and isobutyryl derivatives and the acetyl derivative itself have all been shown to have biological activity. The activity of the phenylacetyl derivative of Cephalosporin $C_A$ (pyridine) has not as yet been determined but, as Cephalosporin $C_A$ (pyridine) is more active than Cephalosporin C, it is expected that the activity of the phenylacetyl derivative thereof will be high.

Other N-acyl derivatives which are of importance are the hexanoyl, p-nitrophenylacetyl and p-nitrophenoxyacetyl derivatives.

Where any of $R_1$, $R_2$ and $R_3$ represent alkyl groups, the groups may be quite large and groups containing 1 to 10 carbon atoms, but more particularly 1 to 6 carbon atoms, are preferred. Where any of $R_1$, $R_2$ and $R_3$ represent substituted phenyl groups, nitro, chloro, alkyl and alkoxy groups are preferred substituents. In the case of alkoxy groups, methoxy and ethoxy groups are especially suitable. Also, where $R_1$ is hydrogen or an alkyl group and $R_2$ is an alkyl group, the total number of carbon atoms in the groups $R_1$ and $R_2$ is preferably 4, and is desirably not greater than 4. Where $R_1$ represents a phenyl, phenoxy, substituted phenyl or substituted phenoxy group, and $R_2$ is an alkyl group, $R_2$ preferably contains only 1 carbon atom, and desirably not more than 3 or 4 carbon atoms.

Further according to the invention, there is provided a process for the preparation of the aforementioned N-acyl derivatives of the nuclei of Cephalosporin C, Cephalosporin $C_c$ and Cephalosporin $C_A$ compounds comprising treating a compound selected from the group consisting of the nucleus of Cephalosporin $C_c$ and a Cephalosporin $C_A$ compound with an acylating agent capable of acylating the amino group of said nucleus with the group wherein $R_1$, $R_2$ represent groups as hereinbefore defined. As acylating agents, suitable functional derivatives of the acid $R_1$, $R_2$CH.COOH may be employed e.g. on acid halide. The sodium, potassium and ammonium salts of the N-acyl derivatives of Cephalosporin C may be prepared from the products of acylation by treatment with sodium, potassium and ammonium hydroxide respectively.

The nucleus to be acylated can be prepared in situ in the reaction mixture by acid treatment of Cephalosporin C, Cephalosporin $C_c$ or a Cephalosporin $C_A$ compound as hereinbefore described. After acid treatment and before acylation, it is preferable to buffer the solution to a pH in the range of about 6 to 7. A useful technique for concentrating the nucleus in such a process includes the steps of contacting the solution containing the nucleus with a strong base anion exchange resin in the acetate form, eluting the resin with acetic acid and collecting the fractions of eluate which contain the nucleus. An eminently suitable resin is Dowex-1×8 in the acetate form, and a suitable eluting solvent is acetic acid of strength in the range of about .5 N to N.

The following examples illustrate the invention:

EXAMPLE 1

*Preparation of the Cephalosporin C nucleus*

Cephalosporin C sodium salt (2 g.) was dissolved in 30 ml. water, the pH adjusted to 2.5 by addition of Dowex 50×8 (H+), the resin filtered and washed with 10 ml. water, and 10.2 ml. N-HCl added to the combined filtrate and washings. The solution was kept at 20° for 3 days and added to a column of Dowex-1 (acetate form), 2.1 cm. diam. x 7 cm. The percolate was collected in 5 ml. fractions (1 to 12) and the column was eluted with water until a total of 34 fractions had been collected. Elution was then begun with 0.5 N acetic acid and a further 66 fractions collected. The optical density at 260 m$\mu$ was measured for each fraction.

Fractions 2–16 were pooled and concentrated in vacuo when Cephalosporin $C_c$ (312 mg.) separated in crystalline form. Fractions 36–45 contained most of the Cephalosporin C nucleus, which yielded an active phenylacetyl derivative. These fractions were pooled and freeze dried (40 mg.). On phenylacetylation this material yielded 250 units of activity against Staph. aureus per mg. of original product.

The new compound was further purified by electrophoresis of the appropriate fraction from the Dowex-1 (acetate) column. Electrophoresis was carried out in a Beckman/spinco Model CP continuous flow paper electrophoresis cell. The buffer used was made by adding pyridine to 0.05 N-acetic acid until the pH rose to 4.0. The cell was run at constant current (40 ma.), the potential being 880 v. The sample, in 20 ml. buffer, was fed to the curtain during 24 hours and 32 fractions were collected, the fractions being numbered from cathode (1) to anode (32). The volume of each fraction was about 12 ml. At the end of the experiment the paper curtain was sprayed with ninhydrin. This revealed a strong band of material with very little mobility which flowed off the curtain in fractions 13–15, a band of strongly acidic material which had flowed into the anode wick, and a faint band of a product (corresponding to $\alpha$-aminoadipic acid) which had migrated towards the anode and flowed off the curtain in fraction 24.

To determine the position of the new compound 10×10 $\mu$l. spots from each fraction were applied to paper and the paper was sprayed with M-pyridine in 50% acetone and then with 2% phenylacetyl chloride in acetone. After contact of the paper with plates seeded with Staph. aureus and incubation of the plates, a large zone of inhibition was found in a position corresponding to fraction 22 and a smaller one in a position corresponding to fraction 23.

Freeze-drying of fraction 22 yielded a residue which was too small to be weighed accurately. In aqueous solution the ultraviolet absorption spectrum of the product showed a plateau at 260 m$\mu$, and its total weight (43 $\mu$g.) was estimated from the extinction at this wavelength on the assumption that the molecular weight of the substance was that of 7-amino-cephalosporanic acid and that its molecular extinction was the same as that of Cephalosporin C. The product was phenylacetylated in aqueous acetone containing phosphate buffer, pH 6.5. The activity of the phenylacetyl derivative against Staph. aureus corresponded to 1450 units per mg. of original product. Cephalosporin C shows an activity of 8–10 units per mg. against the same organism.

The amino group in 6-aminopenicillanic acid (penicillin nucleus) shows a relatively weak basicity, the isoelectric point of the compound being reported to be at pH 4.3 (Batchelor, Doyle, Naylor and Rolinson, 1959). This is readily understandable, since the amino group is $\beta$ to both a CON grouping and a CH—S— grouping. For similar reasons the amino group of 7-aminocephalosporanic acid should be weakly basic and the substance should migrate towards the anode at ph 7. The properties of the new compound from Cephalosporin C (described on pages 5 and 6) indicated that it was in fact 7-aminocephalosporanic acid.

EXAMPLE 2

*Preparation of the 7-phenylacetamidocephalosporanic acid*

Figure 1:
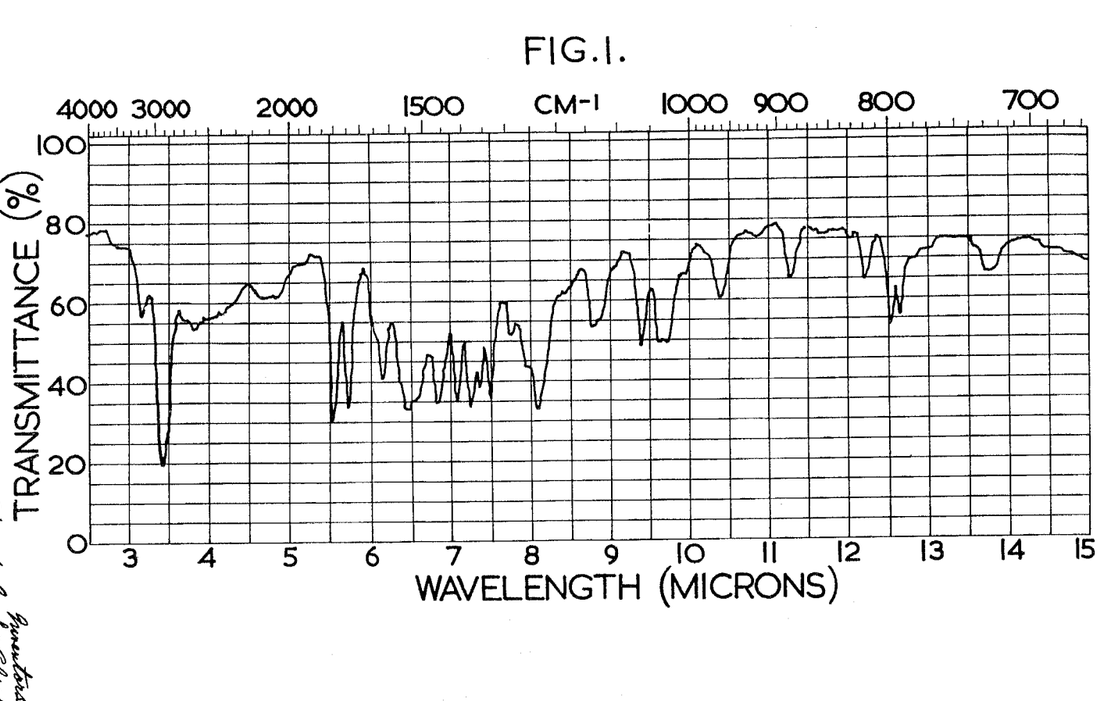
Figure 2:
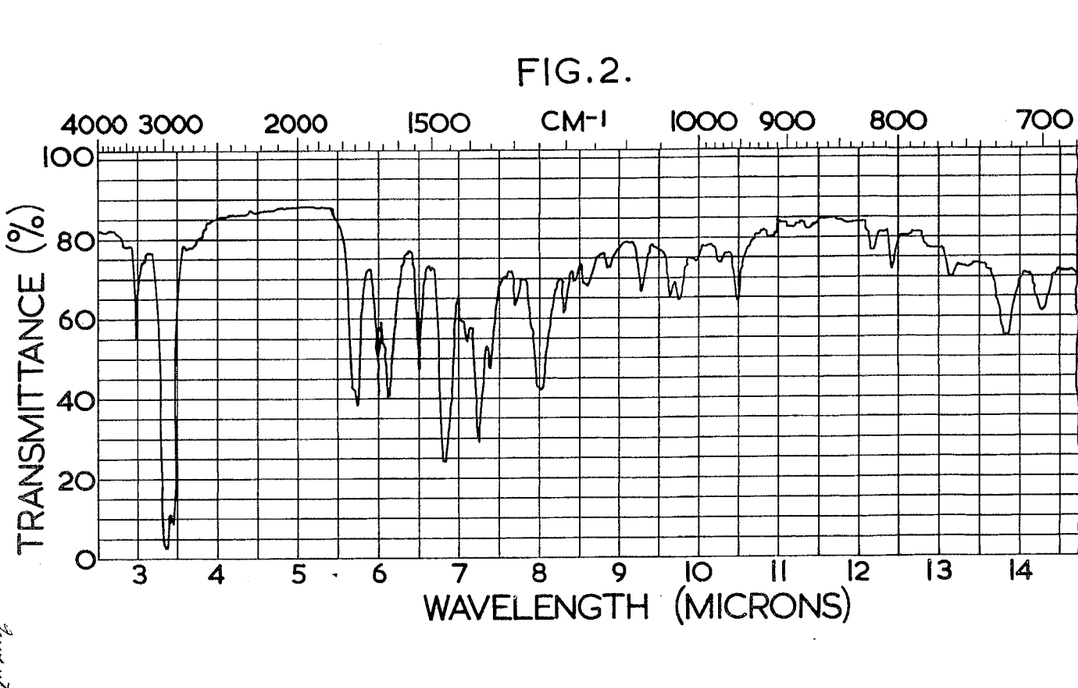

Cephalosporin C sodium salt was treated with dilute hydrochloric acid at room temperature in the manner already described. The resulting solution, containing 7-aminocephalosporanic acid and other products of mild acid degradation of Cephalosporin C, was neutralized and buffered at pH 7.0 with sodium bicarbonate solution in an atmosphere of $CO_2$. Penylacetyl chloride (1.2 equiv., based on the amount of Cephalosporin C used) in acetone was slowly added to the neutral solution, which had been cooled to 0° and mixed with sufficient acetone to make the final acetone concentration 50% after the addition of the phenylacetyl chloride solution. After one hour the pH of the mixture was then adjusted to 5.0 (glass electrode), and acetone was removed in vacuo. The pH was then lowered to 2.0 and the 7-phenylacetamidocephalosporanic acid, together with N-phenacetylcephalosporin $C_c$ and N-phenylacetylcephalosporin C, were extracted into butyl acetate. The butyl acetate was separated and back extracted with water which was brought to ph 5.0, at equilibrium, by the addition of alkali. The aqueous extract was freeze-dried. When a portion of the product (150 $\mu$g.) was chromatographed on paper in n-butanol-ethanol-water (4:1:5 by vol.) it was found to contain three components active against Staph. aureus (see FIG. 1). The major active component was 7-phenylacetamidocephalosporanic acid. The other active components were N-phenylacetylcephalosporin $C_c$ and N-phenylacetylcephalosporin C, both of which had been extracted only in part by the butyl acetate.

The 7-phenylacetamidocephalosporanic acid was separated from the other active components of the crude mixture (17 units/mg. against Staph. aureus), by chromatography on a Grycksbo paper roll column (LKB-Produkter-Sweden), and by counter current distribution.

Elution from the paper column was carried out with n-butanol saturated with water. In a preliminary experiment the sodium salt of 7-phenylacetamidocephalosporanic acid was obtained from the paper column as a powder having an activity of 167 units/mg. This material was clearly far from pure.

Preliminary counter current distributions were carried out in two solvent systems. The first system consisted of equal volumes of butyl acetate and 1% acetic acid (solvent I) and the second of n-butanol and 0.05 M sodium phosphate buffer ph 6.0 (solvent II). After eight transfers in solvent I (10 ml. top layer and 20 ml. bottom layer) the concentration of 7-phenylacetamidocephalosporanic acid reached a maximum between tubes 6 and 7 while the other active components were found in tubes 0 and 1. Material recovered from tubes 5, 6 and 7 assayed approximately 500 units/mg. Paper chromatography of this material in n-butanol-water-ethanol (4:1:5 by vol.) indicated that 7-phenylacetamidocephalosporanic acid was the only active substance that was present.

After 8 transfers in solvent II (20 ml. each layer), the sodium phenylacetamidocephalosporanate showed a peak between tubes 3 and 4 but the bulk of the remainder of the active material had remained in tube 0.

7-phenylacetamidocephalosporanic acid moved towards the anode at almost the same rate as penicillin G when subjected to electrophoresis on paper in collidine acetate buffer, ph 7.0. On incubation with aqueous pyridine at 37°, phenylacetamidocephalosporanic acid was partly converted to an active derivative of the Cephalosporin $C_A$ (pyridine) type. This derivative behaved as a neutral substance when subjected to electrophoresis at pH 7.0.

7-phenylacetamidocephalosporanic acid (about 10 $\mu$g.) was not significantly inactivated by a solution of penicillinase which contained ten times the amount of enzyme shown to completely inactivate 50 $\mu$g. of penicillin G under similar conditions.

The activity of 7-phenylacetamidocephalosporanic acid (benzyl cephalosporin) against a variety of bacteria has been examined using the tube dilution technique. The organisms were grown in nutrient broth, except where otherwise stated, the tubes, containing 2 ml. medium, were inoculated with 0.1 ml. of a 1/100 dilution of an overnight broth culture and incubated at 37° C. for 48 hours. The results are expressed as minimum inhibitory concentration in μg/ml.

| Organism | Strain | Medium | Minimum inhibitory concentration in μg./ml. |
|---|---|---|---|
| Staph. aureus | 1 | Nutrient broth | 0.28 |
| | 2 | ___do___ | 0.07 |
| | 3 | ___do___ | 0.28 |
| | 4 | ___do___ | 0.14 |
| | 5 | ___do___ | 0.38 |
| | 6 | ___do___ | 0.38 |
| | *7 | ___do___ | 1.14 |
| | *8 | ___do___ | 0.57 |
| | 9 | ___do___ | 0.57 |
| | 10 | ___do___ | 1.14 |
| | 11 | ___do___ | 0.28 |
| | *12 | ___do___ | 1.14 |
| | 13 | ___do___ | 0.57 |
| | 14 | ___do___ | 2.28 |
| | 15 | ___do___ | 0.28 |
| | *16 | ___do___ | 0.56 |
| | 17 | ___do___ | 0.28 |
| | *18 | ___do___ | 1.14 |
| | *19 | ___do___ | 0.57 |
| | 20 | ___do___ | 0.75 |
| | *21 | ___do___ | 3.0 |
| | *22 | ___do___ | 3.0 |
| | 23 | ___do___ | 3.0 |
| Micrococcus flavus | | ___do___ | 0.56 |
| Sarcina lutea | | ___do___ | 2.2 |
| Streptococcus haemolyticus | 1 | Brain heart infusion plus 10% serum. | 0.14 |
| | 2 | | 0.28 |
| | 3 | | 0.14 |
| Streptococcus agalactiae | | ___do___ | 0.14 |
| Streptococcus dysgalactiae | | ___do___ | 0.07 |
| Corynebacterium pyogenes | | Nutrient broth plus 10% serum. | 0.07 |
| Coryne bacterium coryzae | | ___do___ | 0.14 |
| Bacillus subtilis | | Nutrient broth | 0.07 |
| Bacillus megatherium | | ___do___ | 0.56 |
| Neisseria catarrhalis | 1 | Nutrient broth plus 10% serum. | 0.28 |
| Do | 2 | ___do___ | 0.28 |
| Haemophilus pertussis | 1 | Bordet gengou agar plus 10% sheep blood. | >15 |
| | 2 | | >15 |
| | 3 | | >15 |
| Escherichia coli | 1 | Nutrient broth | 61 |
| Aerobacter aerogenes | 2 | ___do___ | >122 |
| Klebsiella pneumoniae | | ___do___ | 15 |
| Salmonella typhi | | ___do___ | 7.5 |
| Salmonella typhimurium | | ___do___ | 61 |
| Salmonella meleagidis | | ___do___ | 122 |
| Salmonella heidelburg | | ___do___ | >122 |
| Shigella flexneri | | ___do___ | >122 |
| Proteus vulgaris | | ___do___ | >122 |
| Vibrio cholerae | | ___do___ | 1.5 |
| Saccharomyces cerevisiae | | Nutrient broth plus 2% glucose. | >122 |
| Leptospira pomona | | Korthof's plus 10% serum. | 20 |
| Leptospira icterohaemorrhagiae. | | ___do___ | 10 |

Strains of *Staphylococcus aureus* marked* are resistant to more than 200 μg./ml. of benzylpenicillin.

EXAMPLE 3

*Preparation of Cephalosporin $C_A$ (pyridine) nucleus from Cephalosporin $C_A$ (pyridine)*

Cephalosporin $C_A$ (pyridine) is kept in 0.1 N— or N—HCl at room temperature for 3 or more days. When the products of this reaction are analysed by electrophoresis on paper in pyridine acetate buffer (pH 4.0) followed by contacting the paper with agar plates seeded with *Staph. aureus* a single active zone due to unchanged Cephalosporin $C_A$ (pyridine) is revealed at the concentration used. Cephalosporin $C_A$ (pyridine) behaves as though it has no net charge at pH 4.0. However, duplicate paper strips, which have been sprayed with M-pyridine in 50% aqueous acetone and 0.125% phenylacetyl chloride in dry acetone, reveal an additional active zone on the seeded plates due to the product of the phenylacetylation of the Cephalosporin $C_A$ (pyridine) nucleus. The Cephalosporin $C_A$ nucleus behaves as a base at pH 4.0. It migrates towards the cathode a somewhat greater distance than Cephalosporin C itself migrates towards the anode in the same experiment. It remains in the neutral position on electrophoresis at pH 7. This behaviour is consistent with the properties expected of the Cephalosporin $C_A$ (pyridine) nucleus. (See section 9 of definition of Cephalosporin C nucleus fraction.) A compound with the same properties was formed on incubation of Cephalosporin C nucleus with 2 M-pyridine acetate pH 7 for 16 hours and on phenylacetylation yielded an active phenylacetyl derivative. The properties of the Cephalosporin $C_A$ (pyridine) nucleus were investigated and found to coincide with those as hereinbefore described for it.

EXAMPLE 4

*Preparation of Cephalosporin $C_C$ nucleus*

Cephalosporin C (50 mg.) was held in N— or 0.5 N—HCl (1.33 ml.) at 20° for 2 or 3 days. Under these conditions the 7-aminocephalosporanic acid, which was present in the N—HCl solution after 24 hours, had disappeared after three days. After four days the active zone revealed by phenylacetylation of the Cephalosporin $C_C$ nucleus was still close to the maximum value, but only traces of Cephalosporin $C_C$ remained. Cephalosporin $C_c$ nucleus thus appears to be the relatively acid-stable end product of a series of active or potentially active derivatives formed by treatment of Cephalosporin C with acid under mild conditions.

Cephalosporin $C_C$ nucleus was also formed when Cephalosporin C was kept in contact with an equal weight of wet Dowex 50×8 (—H+) ion exchange resin for 15–48 hours at 20°. Duplicate strips from ionograms run in pyridine acetate buffer, pH 4.5, which were either sprayed with phenylacethylchloride and contacted with a test organism or sprayed with ninhydrin, revealed that the position of the Cephalosporin $C_C$ nucleus corresponded with a yellow zone on the ninhydrin sprayed strips.

The activity of the Cephalosporin $C_C$ nucleus formed from 400 μg. Cephalosporin $C_C$ by treatment with N— HCl was not appreciably affected by the action of penicillinase under conditions which completely destroyed 50μg. of penicillin G.

EXAMPLE 5

(a) *Acylation of 7-aminocephalosporanic acid on paper.*—Samples (each 200μg.) of a crude preparation of Cephalosporin C nucleus were subjected to electrophoresis on paper for 2 hours at 14 volt/cm. in pyridine acetate buffer, pH 4.5. Strips of paper along which each sample had migrated were then cut out and each was sprayed first with M-pyridine in 50% (v./v.) acetone, and then with a solution of a particular acid chloride (0.1 ml.) in acetone (8 ml.). The paper strips were placed on plates seeded with *Staph. aureus* and bioautographs prepared in the manner described in Example 1. The inhibition zones were at the same distance from the origin (1.6 cm. towards the anode) in each case, their positions corresponding to the migration of the Cephalosporin C nucleus. In this way, the phenylacetyl, phenoxyacetyl, n-propionyl, acetyl and isobutyryl derivatives of the Cephalosporin C nucleus were prepared. The zones due to the phenylacetyl and phenoxyacetyl derivatives of the nucleus were about 3.5 cm. in diameter. The zone due to the propionyl derivative was about 2 cm. in diameter. Zones due to the acetyl and isobutyryl derivatives were definite, but very small.

(b) *Acylation of 7-aminocephalosporanic acid in solution.*—A sample (4 mg.) of crude Cephalosporin C nucleus was dissolved in 50 μl. of a solution made by adding 1 ml. pyridine to 5 ml. water. To samples (10 μl.) of the nucleus solution were added 10 μl. of a solution of a particular acid chloride in acetone. (The acid chloride solutions were made by adding 0.68 ml. of phenoxyacetyl chloride, 0.62 ml. of phenylacetly chloride, 0.56 ml. of benzoyl chloride and 0.37 ml. of n-propionyl chloride respectively to 10 ml. of acetone.) The mixtures were kept for 15 minutes at room temperature, diluted if necessary, and 5 μl. samples then spotted onto paper for electrophories or chromatography.

Paper chromatograms were run at room temperature in ethyl acetate saturated with aqueous sodium acetate buffer (0.1 M to sodium), pH 5.4. The paper was pretreated by soaking in the buffer, blotting, and hanging in a stream of air at room temperature, and was used as soon as it was dry. With this system the solvent front reached the bottom of the paper in about 3 hours, but the chromatogram was allowed to continue running for 18 hours.

The activity of the acyl derivatives was measured against *Staphylococcus aureus*. The activity of the phenoxyacetyl derivative was found to be similar to activity of the phenylacetyl derivative, the activity of the n-propionyl derivative to be considerably smaller and the isobutyryl and acetyl derivatives to have a definite but small activity.

All these derivatives were found to migrate a similar distance towards the anode when they were subjected to electrophoresis on paper at pH 4.5 and their position revealed by making bioautographs. The distance was similar to that migrated by Cephalosporin C and by benzylpenicillin.

The phenylacetyl, phenoxyacetyl and n-propionyl derivatives of the Cephalosporin C nucleus could be distinguished from each other by paper chromatography in the ethyl acetate-sodium acetate buffer system described by Hale, Miller and Kelly (Nature 1953, 172, 545). Table 1 shows the $R_F$ values of the various derivatives relative to that of benzylpenicillin (the phenylacetyl derivative of 6-amino-penicillanic acid). The relative $R_F$ values are donated by the symbol $R_{\text{Phenylacetyl-6-APA}}$.

TABLE 1

| Derivative: | $R_{\text{Phenylacetyl-6-APA}}$ |
|---|---|
| n-Propionyl-7 ACA | 0.18 |
| Phenylacetyl-7 ACA | 0.46 |
| Phenoxyacetyl-7 ACA | 0.51 |
| n-Propionyl-6 APA (ethylpenicillin) | 0.43 |
| Phenylacetyl-6 APA (benzylpenicillin) | 1.00 |
| Phenoxyacetyl-6 APA (phenoxymethylpenicillin) | 1.07 |
| α-Phenoxypropionyl-6 APA (α-phenoxyethylpenicillin) | 1.20 |

The N-acyl derivatives of 7-aminocephalosporanic acid reacted with aqueous pyridine, in the region of pH 7, to form active compounds of the $C_A$ type (III). These $C_A$ compounds behaved as though they had no net charge on electrophoresis on paper at pH 4.5 or pH 7.0, whereas the N-acyl derivatives themselves migrated towards the anode.

EXAMPLE 6

*Preparation of the α-phenoxypropionyl derivative of 7-aminocephalosporanic acid (hereinafter referred to as 7-ACA)*

Crystalline 7-ACA (6.5 mg.) was dissolved in a mixture of water (0.9 ml.) and 0.1 ml. 8% sodium bicarbonate (gassed to pH 7.0 with $CO_2$). To this solution was added acetone (1.0 ml.), and the mixture was cooled to 0°. The cooled solution was stirred with a magnetic stirrer while a solution of 6 μl. of redistilled α-phenoxypropionyl chloride in 1.0 ml. of dry acetone was added through a capilliary over a twenty minute period. During the addition of the acid chloride, 1 ml. of a solution containing 25 μl. of 8% sodium bicarbonate (pH 7.0) was added through a second capilliary. After the addition of the acid chloride and the buffer had been completed, the mixture was stirred at 0° for a further 20 minutes. The ice bath was then removed and the mixture allowed to warm up to room temperature and held there for 20 minutes.

The solution was acidified to about pH 5.0 and water (5 ml.) was added. Acetone was removed in vacuo leaving about 3 ml. of aqueous solution. To this solution was added sufficient N—HCl to bring the pH to 3.5 and the acid solution was extracted three times with an equal volume of benzene to remove any free α-phenoxypropionic acid which was present. The aqueous residue was further acidified to pH 2.0, and extracted twice with an equal volume of butyl acetate to remove the α-phenoxypropionyl derivative of 7-ACA. The combined butyl acetate extracts (6 ml.) were back washed with 1.5 ml. of water. The α-phenoxypropionyl-derivative of 7-ACA was re-extracted into an equal volume of water as its sodium salt, by adding 0.1 M sodium hydroxide solution to the mixture until the pH of the aqueous layer at equilibrium was 5.4. A second extraction with an equal volume of water was made, and the combined aqueous extracts were freeze-dried yielding 9 mg. of a fluffy white powder.

*Properties of the α-phenoxypropionyl derivative of 7-ACA biological activity*

When assayed against benzylpenicillin using the whole plate method and *Staphylococcus aureus* as test organisms, the partially pure sodium salt of the α-phenoxypropionyl derivative of 7-ACA was found to contain 107 penicillin units/mg. Since spectrophotometric data indicate that the present sample is approximately 70% pure (see below), it is to be expected that pure sodium salt of the α-phenoxypropionyl derivative of 7-ACA would have about 150 penicillin units/mg.

Figure 3:
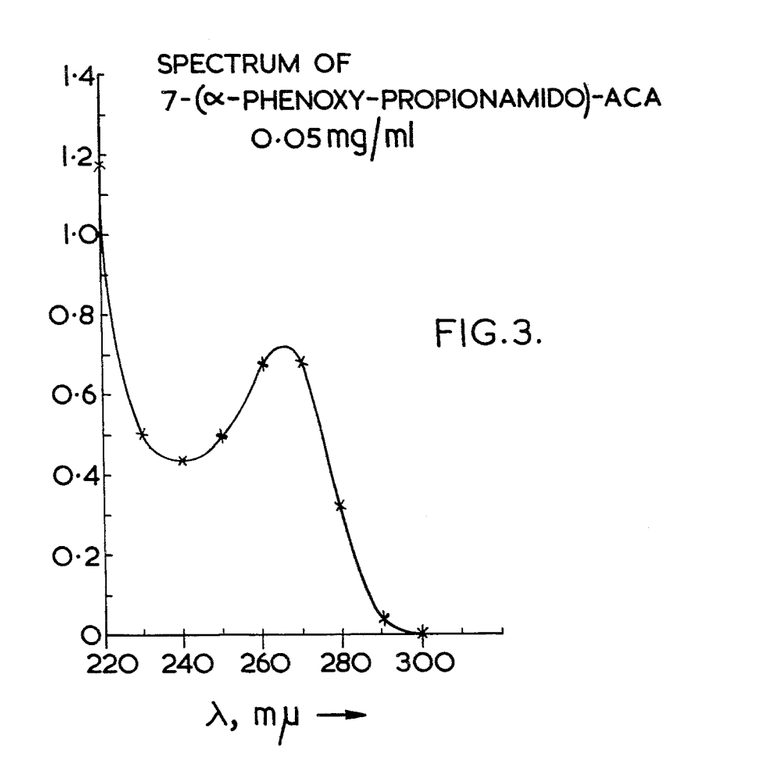

*Ultraviolet absorption spectrum.*—The U.V. spectrum of the partially pure sodium salt of the α-phenoxypropionyl derivative of 7-ACA showed $$\lambda_{max}. \ 265 \ m\mu., \ E^{1\%}_{1cm}. \ 140$$

(see FIG. 3). Comparison with the computed U.V. spectrum for the α-phenoxypropionyl derivative of 7-ACA indicated that the present sample was about 70% pure.

*Rf value reative to benzyl penicillin ($R_{pen.G}$) on paper chromatography.*—When chromatographed in a solvent system consisting of ethyl acetate saturated with sodium acetate buffer (pH 5.0 and 0.1 M to sodium), on Whatman No. 1 paper which had been treated with the same sodium acetate buffer solution and allowed just to dry in air, the sodium salt of the α-phenoxypropionyl derivative of 7-ACA, revealed by a bioautograph, had an $R_{\text{penicillin G}}$ value of 0.78. In the same experiment derivatives of 7-ACA and 6-aminopencillanic acid (6-APA) had the $R_{\text{penicillin G}}$ values shown in the following table:

| Substance: | $R_{pen. \ G}$ Value |
|---|---|
| Sodium benzylpenicillin | 1.00 |
| Sodium 6-(α-phenoxypropionamido pencillanate. (Sodium-α-phenoxyethyl pencillin) | 1.20 |
| Sodium 7-(α-phenoxypropionamido) cephalosporanate | 0.775 |
| Sodium 6-(2′,6′-dimethoxy-benzamido) penicillanate. (Sodium 2,6-dimethoxy-phenylpenicillin) | 0.414 |
| Sodium 7-(2′,6′-dimethoxy-benzamido) cephalosporanate | 0.115 |

We claim:

1. An antibiotically-active N-acyl derivative of a compound selected from the group consisting of the nucleus of Cephalosporin C, Cephalosporin $C_c$ and Cephalosporin $C_A$ compounds wherein the base is a heterocyclic, weak, tertiary base having a cyclic structure containing at least one nitrogen heteroatom and is linked to $CH_2$ via a nitrogen heteroatom, of the formula in which $R_1$ and $R_2$ are each selected from the group consisting of hydrogen, $C_1$ to $C_{10}$ alkyl, phenyl, nitrophenyl, chlorophenyl, alkylphenyl, alkoxyphenyl and $R_3$—O—, in which $R_3$ is selected from the group consisting of $C_1$ to $C_{10}$ alkyl, phenyl, nitrophenyl, chlorophenyl, alkylphenyl and alkoxyphenyl and X is selected from the group consisting of the residue of the nucleus of Cephalosporin C, Cephalosporin $C_c$ and Cephalosporin $C_A$ compounds attached to the acyl group through its 7-position, and the sodium, potassium and ammonium salts thereof.

2. An N-acyl derivative according to claim 1 in which $R_1$ is $R_3$—O—, in which $R_3$ is a phenyl group, and $R_2$ is a hydrogen atom.

3. An N-acyl derivative according to claim 1 in which $R_1$ is phenyl and $R_2$ is hydrogen.

4. 7-phenylacetamido-cephalosporanic acid.

5. 7-phenoxyacetamido-cephalosporanic acid.

References Cited by the Examiner

UNITED STATES PATENTS

| | | | |
|---|---|---|---|
| 2,047,467 | 7/1962 | Doyle et al. | 260—239.1 |
| 3,049,541 | 8/1962 | Abraham et al. | 260—239.1 |
| 3,117,126 | 1/1964 | Hoover et al. | 260—243 |
| 3,124,576 | 3/1964 | Stedman | 260—243 |

OTHER REFERENCES

Abraham, E. P.: Pharmocological Reviews, vol. 14, No. 4, pp. 473–500 (pages 480–486 relied on), December 1962.

Hackh's Chemical Dictionary, page 805 (1937), Second Edition.

NICHOLAS S. RIZZO, *Primary Examiner.*

WALTER A. MODANCE, *Examiner.*

UNITED STATES PATENT OFFICE
CERTIFICATE OF CORRECTION

Patent No. 3,219,662                                November 23, 1965

Edward Penley Abraham et al.

It is hereby certified that error appears in the above numbered patent requiring correction and that the said Letters Patent should read as corrected below.

Column 1, line 50, for "prdoucts" read -- products --; column 2, line 67, for "nucleaus" read -- nucleus --; column 4, line 6, for "Chephalosporin" read -- Cephalosporin --; line 26, for "N-pheylacetyl" read -- N-phenylacetyl --; line 30, for "0.%" read -- 0.1% --; line 32, for "50 ug." read -- 50 µg. --; column 5, line 49, for "n-butonal-ethanol-water" read -- n-butonol-ethanol-water --; column 6, line 58, for "techn que" read -- technique --; column 7, line 66, for "ph" read -- pH --; column 8, line 5, for "Penylacetyl" read -- Phenylacetyl --; lines 17, 43 and 60, for "ph", each occurrence, read -- pH --; column 10, line 28, for "phenylacethylchloride" read -- phenylacetylchloride --; lines 49 and 50, for "inhibitation" read -- inhibition --; line 68, for "phenylacetly" read -- phenylacetyl --; line 73, for "electrophories" read -- electrophoresis --; column 11, line 29, for "donated" read -- denoted --; lines 38 and 39, for "phenoxymethylpencillin" read -- phenoxymethylpenicillin --; column 12, line 46, for "pencillin" read -- penicillin --.

Signed and sealed this 27th day of September 1966.

(SEAL)
Attest:

ERNEST W. SWIDER
Attesting Officer

EDWARD J. BRENNER
Commissioner of Patents